United States Patent
Lee et al.

(10) Patent No.: US 10,795,441 B2
(45) Date of Patent: Oct. 6, 2020

(54) METHOD OF RECOGNIZING USER INTENTION BY ESTIMATING BRAIN SIGNALS, AND BRAIN-COMPUTER INTERFACE APPARATUS BASED ON HEAD MOUNTED DISPLAY IMPLEMENTING THE METHOD

(71) Applicant: Korea University Research and Business Foundation, Seoul (KR)

(72) Inventors: Seong-Whan Lee, Seoul (KR); No-Sang Kwak, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 134 days.

(21) Appl. No.: 16/117,814

(22) Filed: Aug. 30, 2018

(65) Prior Publication Data
US 2019/0121431 A1    Apr. 25, 2019

(30) Foreign Application Priority Data

Oct. 23, 2017    (KR) .......................... 10-2017-0137143
May 21, 2018    (KR) .......................... 10-2018-0057871

(51) Int. Cl.
*G06F 3/01*      (2006.01)
*G06F 3/0346*    (2013.01)
*G02B 27/01*     (2006.01)

(52) U.S. Cl.
CPC ............ *G06F 3/015* (2013.01); *G02B 27/017* (2013.01); *G06F 3/011* (2013.01); *G06F 3/012* (2013.01); *G06F 3/0346* (2013.01)

(58) Field of Classification Search
CPC .......... G06F 3/015; G06F 3/011; G06F 3/012; G06F 3/0346; G02B 27/017; G02B 2027/0187
See application file for complete search history.

(56) References Cited

U.S. PATENT DOCUMENTS

2006/0061544 A1*  3/2006  Min ................... G02B 27/0093
                                                          345/156
2010/0191140 A1*  7/2010  Terada ............... A61B 5/04842
                                                          600/544

(Continued)

FOREIGN PATENT DOCUMENTS

| KR | 1020020069382 | 9/2002  |
| KR | 101203921     | 11/2012 |
| KR | 1020160026557 | 3/2016  |

*Primary Examiner* — Alexander Eisen
*Assistant Examiner* — Kebede T Teshome
(74) *Attorney, Agent, or Firm* — Cantor Colburn LLP

(57) ABSTRACT

An exemplary embodiment of the present disclosure provides a method of recognizing, by a controller, an intention of a user who wears a head mounted display to which electroencephalogram electrodes are attached. The method includes obtaining brain signals for learning from each of the head mounted display and an additional electrode device coupled to the head mounted display, in a state where a training image causing brain signals is displayed on the head mounted display; learning a first relational model between electrodes of the head mounted display and electrodes of the additional electrode device using the brain signals for learning; measuring brain signals by the head mounted display decoupled with the additional electrode device, in a state where a specific image is displayed on the head mounted display; estimating brain signals of the additional electrode device non-measured, from the brain signals measured by the head mounted display based on the first relational model; and recognizing a user intention corresponding to the measured brain signals and the estimated brain signals.

17 Claims, 18 Drawing Sheets

(56) References Cited

U.S. PATENT DOCUMENTS

| | | | |
|---|---|---|---|
| 2015/0250401 A1* | 9/2015 | Tveit | A61B 5/04842 600/544 |
| 2016/0077547 A1* | 3/2016 | Aimone | G06F 3/012 345/8 |
| 2017/0243499 A1* | 8/2017 | Maruyama | G06F 3/015 |
| 2019/0369727 A1* | 12/2019 | Li | G06F 3/011 |

* cited by examiner

METHOD OF RECOGNIZING USER INTENTION BY ESTIMATING BRAIN SIGNALS, AND BRAIN-COMPUTER INTERFACE APPARATUS BASED ON HEAD MOUNTED DISPLAY IMPLEMENTING THE METHOD

CROSS REFERENCE TO RELATED APPLICATIONS

This application claims priority to and the benefit of Korean Patent Application No. 10-2017-0137143 filed on Oct. 23, 2017, and Korean Patent Application No. 10-2018-0057871 filed on May 21, 2018. The entire disclosures of the above patent applications are incorporated by reference herein in their entireties.

BACKGROUND

1. Field

Methods and apparatuses consistent with exemplary embodiments broadly relate to a brain-computer interface (BCI).

2. Description of Related Art

A brain-computer interface is a technology of recognizing a user intention by analyzing brain signals generated during various brain activities and controlling an external device through the recognized user intention. A user is capable of controlling a computer or machines through the brain-computer interface without using muscle. The brain-computer interface is mainly used for developing a device, which assists movements of patients having problems in motor nerves due to accidents or diseases, and recently, research for applying the brain-computer interface is conducted in various fields.

A wearable device, such as a head mounted display, outputs an image to positions facing the eyes of a user and provides augmented reality or virtual reality. The head mounted display may detect a motion of a user by using a gyro sensor and the like, but the user needs to wear the head mounted display and controls an image by using a tool, such as a joystick and a keyboard. When the brain-computer interface is used for controlling the head mounted display, it is possible to control the image without using a tool. However, in order to recognize a user intention by the brain-computer interface, it is necessary to analyze brain signals generated in various brain regions, so that there is a problem in that many electrodes are needed to be attached to a scalp. When the small number of electrodes is attached, it is possible to obtain only the brain signals of regions, to which the electrodes are attached, so that there is a problem in that recognition accuracy is degraded. Further, electrodes may be attached to a head mounted display having a hat form, but it is difficult to manufacture a small and light head mounted display and a price of the head mounted display is high, so that it is not easy to apply the brain-computer interface to the head mounted display.

Accordingly, in order to be conveniently used by a user in actual life, a brain-computer interface technology, which is capable of maintaining high recognition performance while using the small number of electrodes, is required. Further, there is need for a method of efficiently controlling a head mounted display by using various brain signal measurement paradigms of the brain-computer interface.

SUMMARY

The present disclosure has been made in an effort to provide a method of recognizing a user intention by estimating brain signals, and a brain-computer interface apparatus based on a head mounted display implementing the method. Particularly, the present disclosure has been made in an effort to couple a detachable additional electrode device to a head mounted display having electrodes, obtain brain signals for learning, generate an inter-electrode relational model based on the brain signals obtained from the electrodes. Then the present disclosure has been made in an effort to estimate brain signals required for the recognition of the user intention based on the brain signals measured by the head mounted display and the inter-electrode relational model.

The present disclosure has also been made in an effort to provide a method of controlling a head mounted display using an electrooculography (EOG) signal.

An exemplary embodiment of the present disclosure provides a method of recognizing, by a controller, an intention of a user who wears a head mounted display to which electroencephalogram electrodes are attached. The method includes obtaining brain signals for learning from each of the head mounted display and an additional electrode device coupled to the head mounted display, in a state where a training image causing brain signals is displayed on the head mounted display; learning a first relational model between electrodes of the head mounted display and electrodes of the additional electrode device using the brain signals for learning; measuring brain signals by the head mounted display decoupled with the additional electrode device, in a state where a specific image is displayed on the head mounted display; estimating brain signals of the additional electrode device non-measured, from the brain signals measured by the head mounted display based on the first relational model; and recognizing a user intention corresponding to the measured brain signals and the estimated brain signals.

The method may further include learning a classification model of user intention using the brain signals for learning. The recognizing the user intention may determine the user intention using a combination signal of the measured brain signals and the estimated brain signals based on the learned classification model.

The training image may be an interface image provided for causing brain signals corresponding to a specific brain-computer interface paradigm.

The brain-computer interface paradigm may be at least one of a motor imagery potential, a steady-state visual/auditory/somatosensory evoked potential, and an event-related potential.

When the training image is an interface image causing brain signals corresponding to motor imagery, the brain signals for learning may include signals caused by an imagination of a movement of a designated body part on the training image.

When the training image is an interface image causing brain signals corresponding to an event-related potential, the training image may be separated into a left image and a right image corresponding to both eyes, respectively, and provide visual stimulus of flickering the same object at different frequencies on the left image and the right image. The brain signals for learning may include signals caused by the visual stimulus included in the training image.

When the training image is an interface image causing brain signals corresponding to a steady-state visual evoked potential, the training image may provide a plurality of selectable objects with different visual stimuli. The brain signals for learning may include signals caused when the user looks at a specific object among the plurality of objects on the training image.

The learning the first relational model may include generating feature vectors of electrodes, respectively, wherein feature vector of each electrode comprises brain signals measured at a predetermined number of past cycles and a current cycle, at corresponding electrode; and learning the first relational model using the feature vectors of electrodes.

The method may further include controlling the specific image based on the determined user intention.

The controlling the specific image may further include detecting a gaze movement based on electrooculography signals measured from electrooculography electrodes attached to the head mounted display; and changing a viewpoint of the specific image according to the detected gaze movement.

The method may further include, before the controlling the specific image, learning a second relational model between electrooculography signals for learning and movements of a cursor, wherein the electrooculography signals for learning and the movements of the cursor are obtained in a state where a cursor image displays the cursor moving according to a user gaze on the head mounted display. The detecting the gaze movement may detect the gaze movement corresponding to the measured electrooculography signals based on the second relational model.

Another exemplary embodiment of the present disclosure provides a brain-computer interface apparatus. The brain-computer interface apparatus includes a head mounted display having electroencephalogram electrodes as a first channel group; an additional electrode device having electroencephalogram electrodes as a second channel group, which is detachable from the head mounted display; and a controller which stores a relational model between brain signals of the first channel group and brain signals of the second channel group, and controls the head mounted display decoupled with the additional electrode device based on the relational model and brain signals of the first channel group. The controller receives brain signals measured by the first channel group in a state where a specific image is displayed on the head mounted display, estimates brain signals of the second channel group based on the relational model, recognizes a user intention using the measured brain signals of the first channel group and the estimated brain signals to the second channel group, and controls the specific image based on the user intention.

The controller, in a learning mode that the head mounted display and the additional electrode device are coupled displays a training image causing brain signals on the head mounted display, may obtain brain signals for learning from the first channel group and the second channel group, learn the relational model using the brain signals for learning, and store the learned relational model.

The training image may be an interface image provided for causing brain signals corresponding to a specific brain-computer interface paradigm. The brain-computer interface paradigm may be at least one of a motor imagery potential, a steady-state visual/auditory/somatosensory evoked potential, and an event-related potential.

The controller may learn the relational model based on a regression analysis on the brain signals for learning.

The controller may recognize the user intention corresponding to a feature of a combination signal based on a learned classification model of user intention. The combination signal may include the measured brain signals from the first channel group and the estimated brain signals to the second channel group. The classification model may be trained to classify the user intention to any one of a plurality of intentions designed in a specific brain-computer interface paradigm, based on feature of the brain signals of the first channel group and the second channel group.

Yet another exemplary embodiment of the present disclosure provides a brain-computer interface apparatus. The brain-computer interface apparatus includes a head mounted display which comprises a main body having at least one processor, a memory, and a display, and a fixing part connected to the main body, wherein the fixing part sustains the main body when user wears the head mounted display on head; and an additional electrode device having electroencephalogram electrodes in internal surface contacting with the head of the user, which is coupled to or separated from the head mounted display. The head mounted display further includes a plurality of electroencephalogram electrodes disposed on an inside of the fixing part along a head circumference to contact with the head of the user; a plurality of electrooculography electrodes disposed on an inside of the main body to contact around eyes of the user; a reference electrode disposed in a region of the main body that is in contact with face of the user; and a fastening part disposed on at least one of the main body and the fixing part, and coupled to or separated from the additional electrode device.

According to the exemplary embodiments, since an inter-electrode relational model is trained based on brain signals obtained from a head mounted display and additional electrode device coupled to the head mounted display, it is possible to estimate brain signal of some electrodes based on the inter-electrode relational model. Therefore a user intention can be sufficiently recognized from brain signals measured by the head mounted display without the additional electrode device.

According to the exemplary embodiments, it is possible to provide a user with a convenient, high reality, and natural control environment through the head mounted display, to which electroencephalogram electrodes and electrooculography electrodes are attached. Accordingly, a user wearing a brain-computer interface apparatus based on the head mounted display is capable of controlling a target object with thinking the control or moving eyes, instead of directly controlling the target object using a body, such as a hand or an arm.

According to the exemplary embodiments, a content provided to the head mounted display is changed according to user's viewpoint, so that it is possible to provide augmented reality and virtual reality similar to an actual life according to an eye movement of the user.

According to the exemplary embodiments, the brain-computer interface is applied to various fields, such as a game, entertainment, health care, and a mobile display, utilizing a head mounted display, so that it is possible to provide an optimum control environment appropriate to the contents.

DETAILED DESCRIPTION OF EXEMPLARY EMBODIMENTS

Figure 1A:
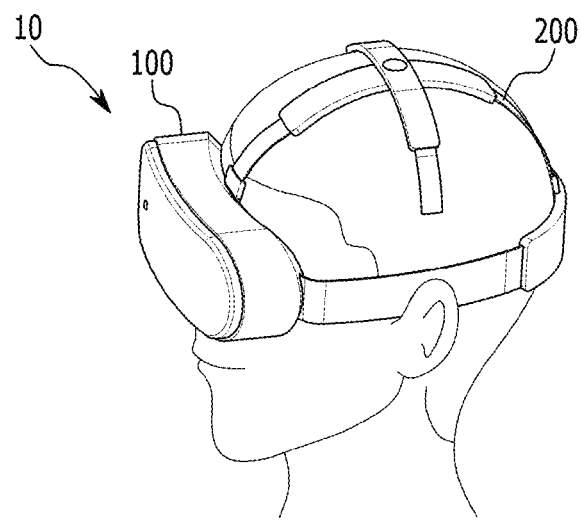
FIGS. 1A and 1B are diagrams illustrating a user wears a brain-computer interface apparatus based on a head mounted display according to one exemplary embodiment.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Figure 1B:
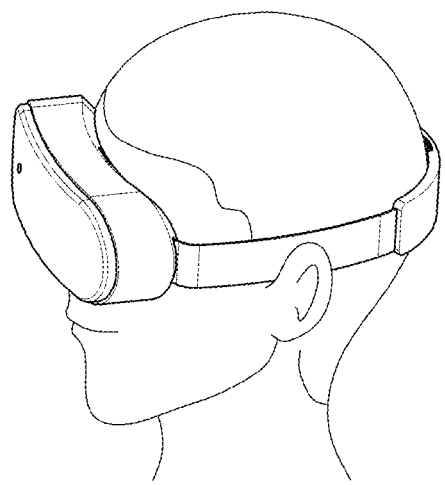
Figure 2A:
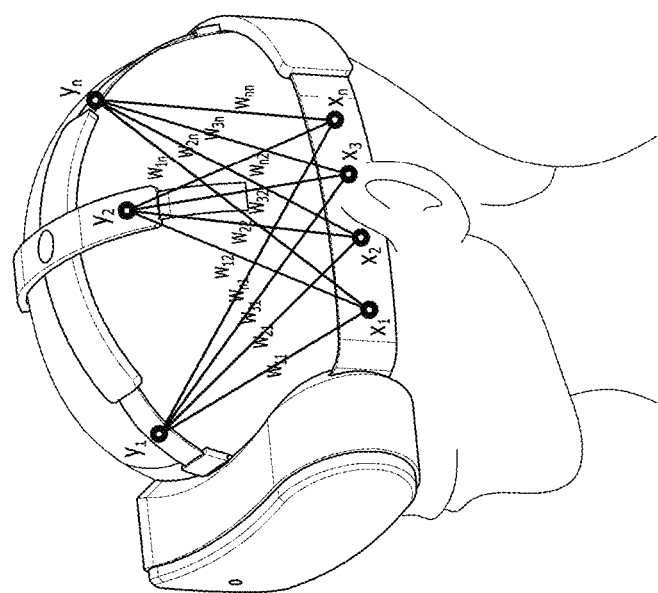
FIGS. 2A and 2B are diagrams conceptually illustrating an inter-electrode relational model of the brain-computer interface apparatus based on the head mounted display according to the exemplary embodiment.
Figure 2B:
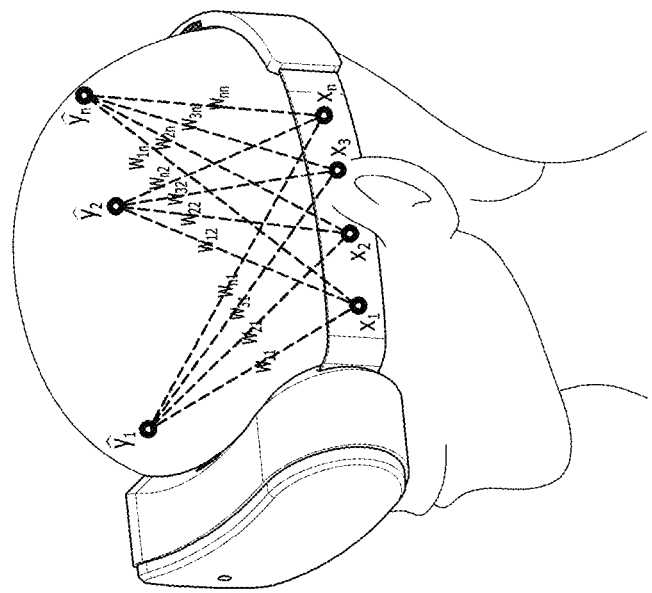

FIGS. 1A and 1B are diagrams illustrating a user wears a brain-computer interface apparatus based on a head mounted display according to one exemplary embodiment, and FIGS. 2A and 2B are diagrams conceptually illustrating an inter-electrode relational model of the brain-computer interface apparatus based on the head mounted display according to the exemplary embodiment.

Referring to FIGS. 1A and 1B, a brain-computer interface apparatus 10 based on a head mounted display includes a head mounted display 100, to which electrodes are attached, and an electrode device (hereinafter, referred to as an "additional electrode device") 200 detachable from the head mounted display 100. Electroencephalogram (EEG) electrodes disposed in each of the head mounted display 100 and the additional electrode device 200 may be pre-set to points, at which brain signals may be measured, or may be adjusted by a user. The head mounted display 100 may further include electrooculography (EOG) electrodes which measure EOG signals.

As illustrated in FIG. 1A, the head mounted display 100 may be coupled to the additional electrode device 200, which is called a coupling state. As illustrated in FIG. 1B, the additional electrode device 200 may be separated or detached from the head mounted display 100, which is called a separation state.

In the description, it is described that one additional electrode device 200 is coupled to or separated from the head mounted display 100, but the plurality of additional electrode devices may be coupled to the head mounted display 100. In this case, when at least one additional electrode device among the plurality of additional electrode devices is separated, it may be called a separation state.

Referring to FIG. 2A, brain signals are measured in the state where a user wears the head mounted display 100 coupled with the additional electrode device 200. The brain signals measured in the coupling state are used as training data for estimating brain signals not to be measured in the separation state. The measured brain signals in the coupling state trains a relational model W (simply, referred to as an inter-electrode relational model) between the electrodes of the head mounted display 100 and the additional electrode device 200. That is, a relational model W between electrodes is learned based on brain signals x measured by the electrodes X1, X2, . . . , and Xnx of the head mounted display 100 and brain signals y measured by the electrodes Y1, Y2, . . . , and Yny of the additional electrode device 200. The inter-electrode relational model W may be a regression model acquired by a regression analysis, such as a linear regression analysis and a non-linear regression analysis.

Referring to FIG. 2B, the user wears only the head mounted display 100, and the additional electrode device 200 is separated from the head mounted display. The electrodes X1, X2, . . . , and Xnx of the head mounted display 100 measure brain signals. In this case, it is possible to estimate brain signals ŷ of non-measured points, that is, the electrodes Y1, Y2, . . . , and Yny of the additional electrode device 200, based on the inter-electrode relational model W learned by the brain signals measured in the coupling state.

As described above, according to the present disclosure, even though only the brain signals of some points (electrode channels) are measured in the state where the user wears only the head mounted display 100, it is possible to estimate brain signals of other points through the learned inter-electrode relational model. That is, the brain signals are additionally obtained in order to accurately recognize the user intention through the estimation of the brain signal. Accordingly, even when the user simply wears only the head mounted display 100, the brain signals are sufficiently obtained from the inter-electrode relational model. Therefore user do not need to wear the head mounted display 100 coupled with the additional electrode device 200. As a result, it is possible to conveniently and accurately recognize the user intention.

Figure 3:
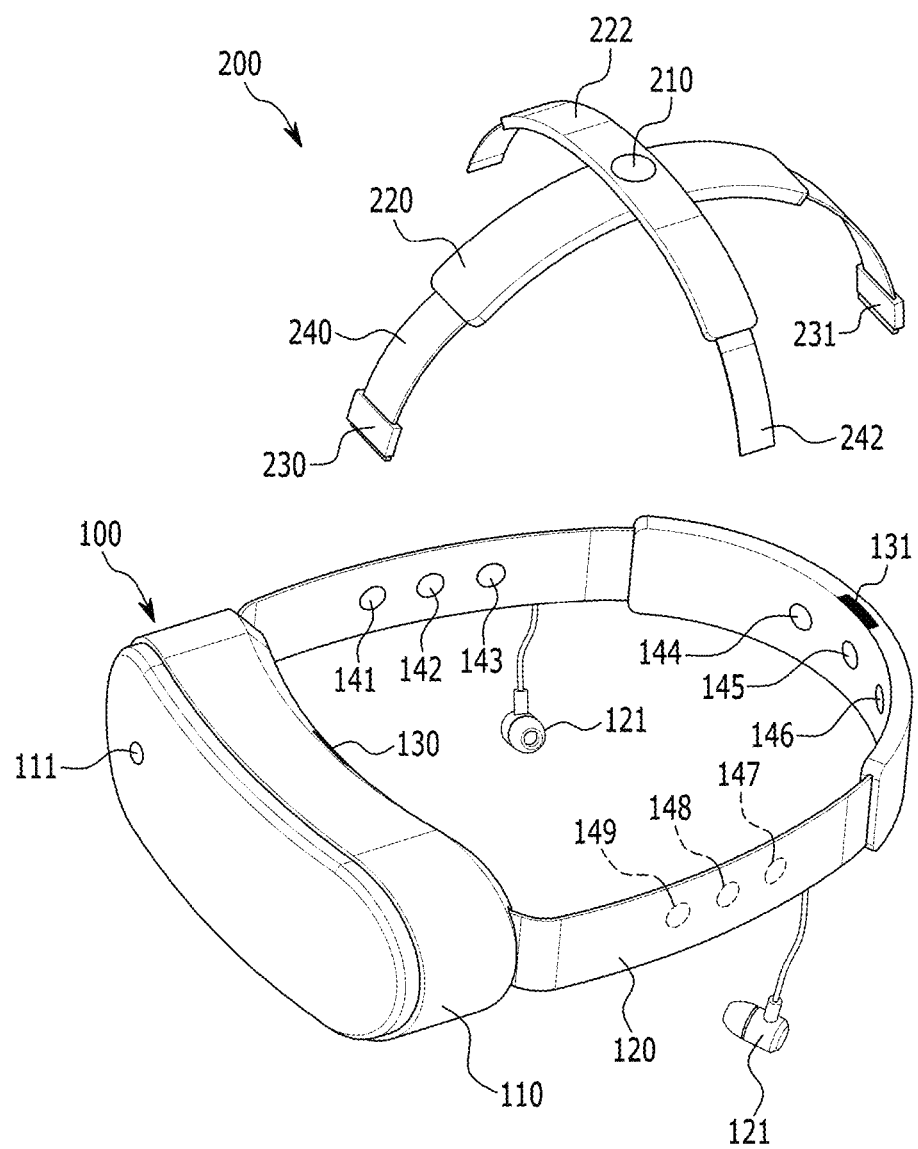
FIGS. 3 and 4 are examples illustrating the brain-computer interface apparatus based on the head mounted display according to the exemplary embodiment.
Figure 4:
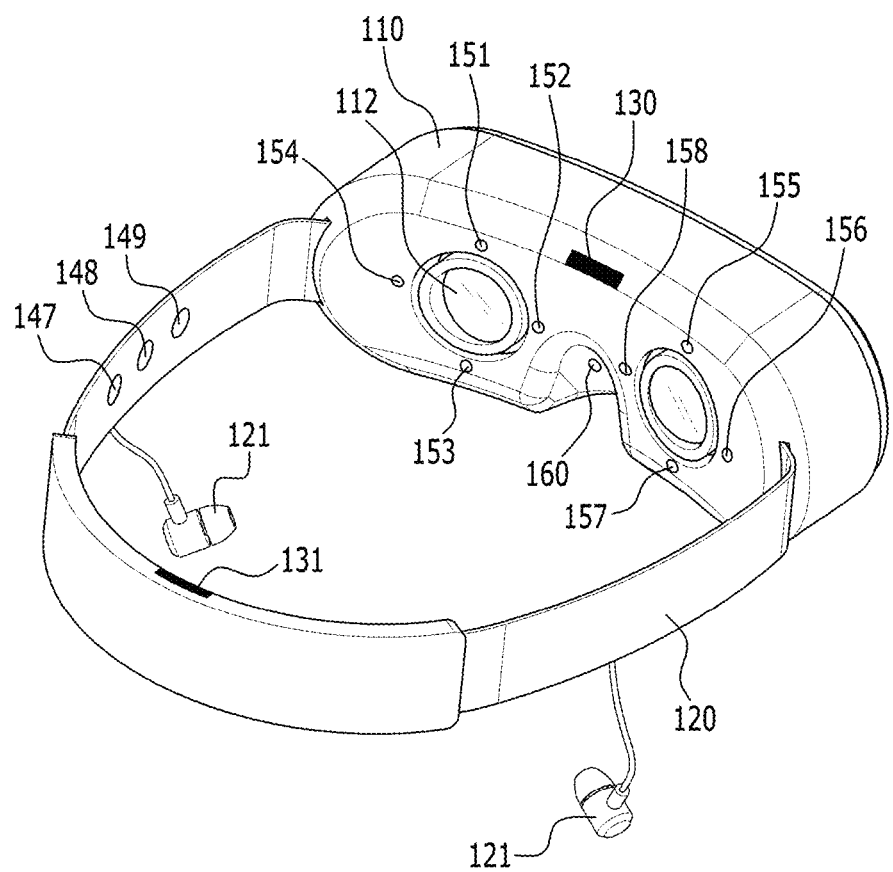

FIGS. 3 and 4 are examples illustrating the brain-computer interface apparatus based on the head mounted display according to the exemplary embodiment.

Referring to FIGS. 3 and 4, the head mounted display 100 includes a main body 110, which is worn on the user and provides contents based on augmented reality and virtual reality, and a fixing part 120, which fixes sustains the main body 110 along a head. When the user wears the head mounted display 100 on the head, an internal surface of the main body 110 contacts with a face of the user. An internal surface of the fixing part 120 contacts with a part of the face and a part of a head along a circumference of the head.

The head mounted display 100 may include various components for providing augmented reality and virtual reality, and may include components of a general head mounted display. For example, the main body 110 includes at least one processor, a memory, and a display. The display may display an augmented reality contents or virtual reality contents. The main body 110 further includes at least one camera 111. The camera 111 may capture the outside in real time and provide augmented reality contents. Lenses 112 may be mounted in a facial portion of the main body 110 at positions corresponding to two eyes of the user. The fixing part 120 may include an earphone 121 or a speaker (not illustrated) for providing a sound (audio signal) generated during the control of the head mounted display. The earphone 121 may further include electroencephalogram electrodes, to measure brain signals inside an ear. The electroencephalogram electrodes may be in an inserted portion of the earphone 121 which is directly inserted to the ear of the user.

Fastening parts 130 and 131, to/from which the additional electrode device 200 are coupled/separated, are formed in at least one of the main body 110 and the fixing part 120. Positions of the fastening parts may be various according to a coupling form. For example, in the case of the additional electrode device 200 illustrated in FIG. 2, a front coupling part 230 and a rear coupling part 231 of the additional electrode device 200 are inserted and coupled to the fastening parts 130 and 131, respectively.

The head mounted display 100 includes a plurality of electrodes. The electrodes may be disposed at various positions according to brain signal measurement points or EOG signal measurement points. A plurality of electroencephalogram electrodes 141, 142, . . . , and 149 may be attached to an internal surface of the fixing part 120 along the head circumference. The internal surface of the fixing part 120 directly faces the head of the user. A plurality of EOG electrodes 151, 152, . . . , and 158 may be attached to an internal surface of the main body 110 which directly faces the face of the user. The EOG electrodes may be disposed close to the the user's eyes, and may be attached at upper/lower/left/right sides around the eyes. The main body 110 may include a reference electrode (or a ground electrode) 160 as a reference of brain signals and an EOG signals, and the reference electrode 160 may be attached to, for example, a position facing the user's nose. In this case, the reference electrode and the ground electrode may be used as one electrode.

The additional electrode device 200 includes a plurality of electroencephalogram electrodes (not illustrated) attached to an internal surface (lower surface) which contacts with the head of the user wearing the additional electrode device 200. For example, the plurality of electroencephalogram electrodes may be disposed in the lower surface of the additional electrode device 200 in a horizontal direction and a vertical direction.

A shape of the additional electrode device 200 may be variously designed. For example, the additional electrode device 200 includes a first body having a predetermined length and width in front and rear directions, and a second body having a predetermined length and width in left and right directions in the state where the user wears the additional electrode device 200. The first body and the second body may be physically and electrically connected through a connection part 210 at a center at which the first body and the second body cross.

The additional electrode device 200 includes a distance extension part for front-rear electrode 220 and a distance extension part for left-right electrode 222 in order to fit the additional electrode device 200 to the head of the user and adjust distance between the electroencephalogram electrodes. The distance extension part 220 may be extended from the connection part 210 in the front and rear directions and the distance extension part 222 may be extended from the connection part 210 in the left and right directions. Each of the distance extension parts 220 and 220 has a shape of a plurality of joints, and each joint may be inserted into a previous joint and be sequentially stretched to the outside when the each joint is extended toward the connection part 210. When at least one joint is stretched, each of the distance extension parts 220 and 220 may have a shape of bent bar contacted closely along a curve of the head of the user. The electroencephalogram electrode may be attached to each of the joints of the connection part 210, the front-rear electrode distance extension part 220, and the left-right electrode distance extension part 222. The additional electrode device 200, provides to measure brain signals of various brain regions of the user, which cannot be measured by the head mounted display 100.

Bridge 240 and 242 for supporting and fixing the additional electrode device 200 on the head of the user may be extended from the distance extension parts 220 and 222, respectively. The bridge 240 and 242 may contact with the head of the user, and may form a strap of a flexible material. A distal end of at least one of the bridge 240 and 242 may form with a front coupling part 230 and a rear coupling part 231 which are inserted into the fastening parts 130 and 131 of the head mounted display 100.

In the meantime, although not illustrated in FIGS. 3 and 4, the brain-computer interface apparatus 10 includes hardware, such as a processor (not illustrated), a memory (not illustrated), and a communication module (not illustrated), performing the method described in the present disclosure, and executes programs (for example, a head mounted display control program) performing the method described in the present disclosure through the hardware. The programs are stored in at least one memory, and at least one processor executes the programs and processes the method described in the present disclosure. Each of the head mounted display 100 and the additional electrode device 200 may be operated by the hardware, such as at least one memory, at least one processor, and at least one communication module. The head mounted display 100 may control the coupled additional electrode device 200 to measure brain signals.

The brain signals measured by the additional electrode device 200 are transmitted to an apparatus learning an inter-electrode relational model based on the measured brain signals, and the apparatus learning the inter-electrode relational model may be the head mounted display 100 or another external apparatus. In this case, the brain signals measured by the additional electrode device 200 may be transmitted to the coupled head mounted display 100, or the additional electrode device 200 may directly transmit the measured brain signals to a designated server. The head mounted display 100 and the additional electrode device 200 may communicate through the communication module. Otherwise, the additional electrode device 200 coupled to the head mounted display 100 may be electrically connected to the head mounted display 100, and the head mounted display 100 may measure brain signals through the coupled additional electrode device 200.

The head mounted display 100 may communicate with an external apparatus (not illustrated), for example, a mobile terminal, through a communication module. The head mounted display 100 may communicate with an external control server through the communication module.

Next, a method of recognizing a user intention by estimating brain signals by the brain-computer interface apparatus will be described. The method described in the present disclosure may be performed by a processor embedded in the head mounted display 100, or may be performed by the interworks of the processors embedded in the head mounted display 100, the additional electrode device 200, and an external control device. In the description, it is assumed that the controller 300 operating by at least one processor processes the method described in the present disclosure, and it is assumed that the controller 300 is included in the head mounted display 100.

Figure 5:
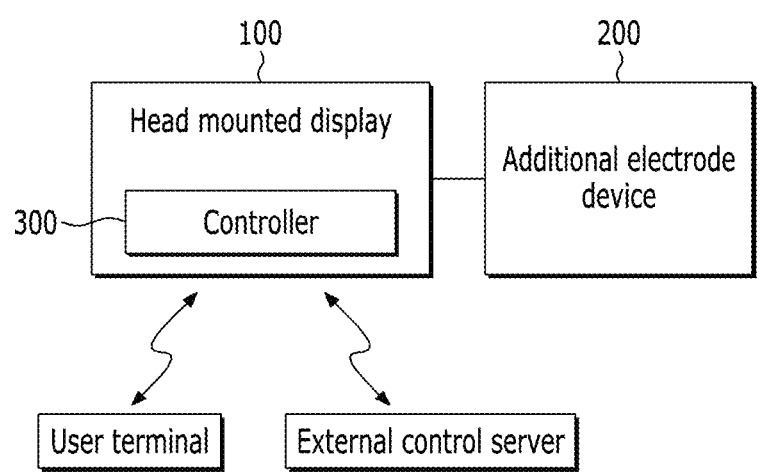
FIG. 5 is a conceptual configuration diagram illustrating the brain-computer interface apparatus based on the head mounted display according to one exemplary embodiment.
Figure 6:
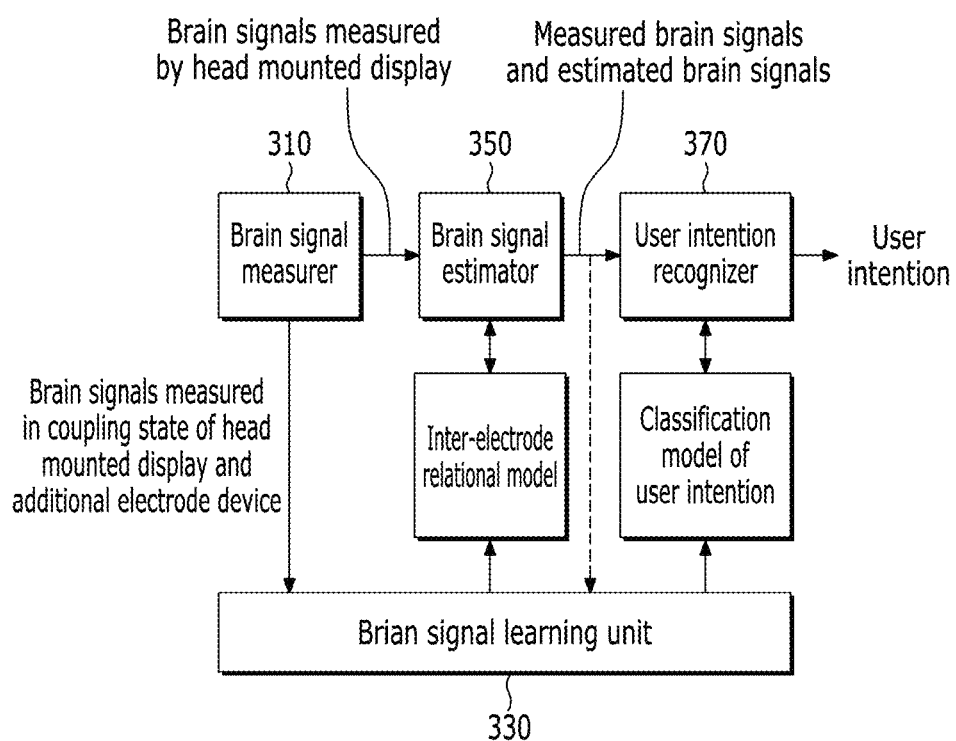
FIG. 6 is a function block diagram illustrating a controller according to one exemplary embodiment.

FIG. 5 is a conceptual configuration diagram illustrating the brain-computer interface apparatus based on the head mounted display according to one exemplary embodiment, and FIG. 6 is a function block diagram illustrating the controller according to one exemplary embodiment.

Referring to FIG. 5, the brain-computer interface apparatus 10 may include the head mounted display 100 and the additional electrode device 200, and the controller 300 controlling the head mounted display 100 and the additional electrode device 200. In addition, the head mounted display 100 may communicate with an external device including a user terminal or an external control server.

The controller 300 may be changed to externally communicate with the head mounted display 100 at an external side of the head mounted display 100 and control the head mounted display 100. Further, the controller 300 may be changed that some functions of the controller 300 are processed by a processor of the head mounted display 100 and the remaining functions are processed by an external control device.

Referring to FIG. 6, the controller 300 includes a brain signal measurer 310, a brain signal learning unit 330, a brain signal estimator 350, and a user intention recognizer 370.

The brain signal measurer 310 measures brain signals of the user in a coupling state of the head mounted display 100 and the additional electrode device 200. The brain signals measured in the coupling state are learning data (training data) used for learning the inter-electrode relational model. In this case, the brain signal measurer 310 may output an image, vibration, a sound, and the like provided for each brain-computer interface paradigm to a display, a vibration sensor, a speaker, and the like of the head mounted display 100, and then may measure brain signals caused by each brain-computer interface paradigm. The brain-computer interface paradigm may include, for example, a motor imagery (MI) potential, a steady-state visual/auditory/somatosensory evoked potential, an event related potential (ERP), and the like caused while imaging a body movement.

The brain signal measurer 310 may receive the estimated brain signals from the brain signal estimator 330. The estimated brain signals may also be used as learning data.

Further, the brain signal measurer 310 measures brain signals of the user wearing the head mounted display 100 in a separation state of the additional electrode device 200. The brain signals measured in the separation state are used for estimating brain signals at non-measured points corresponding to the electrodes of the additional electrode device.

The brain signal measurer 310 may set one of measurement modes to measure the brain signals in order to identify brain signals measured in the measurement mode. The measurement modes may include a learning mode or a coupling mode for measuring brain signals for learning, a user intention recognition mode or a separation mode, and the like. Further, the brain signal measurer 310 may set at least one brain-computer interface paradigm. The brain signal measurer 310 may classify and store the measured brain signals according to a setting of the measurement mode or the brain-computer interface paradigm.

The brain signal learning unit 330 learns an inter-electrode relational model between electrodes of the head mounted display 100 and electrodes of the additional electrode device 200 based on the brain signals for learning. The brain signals for learning are measured by the brain signal measurer 310.

Further, the brain signal learning unit 330 learns a classification model for user intention in a brain-computer interface paradigm, based on the brain signals for learning.

The brain signal learning unit 330 may augment the obtained learning data to increase the learning data. According to a characteristic of deep learning, the data augment provides high performance through the large volume of data as the learning data. Various data augmentation methods may be used.

The brain signal estimator 330 estimates non-measured brain signals of the additional electrode device 200 from the brain signals measured by the head mounted display 100, based on the learned inter-electrode relational model. Since user wears only the head mounted display 100 separated with the additional electrode device 200, it is not able to obtain brain signals from the additional electrode device 200.

The user intention recognizer 250 determines a user intention corresponding to the input brain signals based on the learned classification model of the user intention. The input brain signals may be the brain signals measured by the head mounted display 100 and the estimated brain signals. Otherwise, the input brain signals may be the brain signals measured in the coupling state of the head mounted display 100 and the additional electrode device 200.

Figure 7:
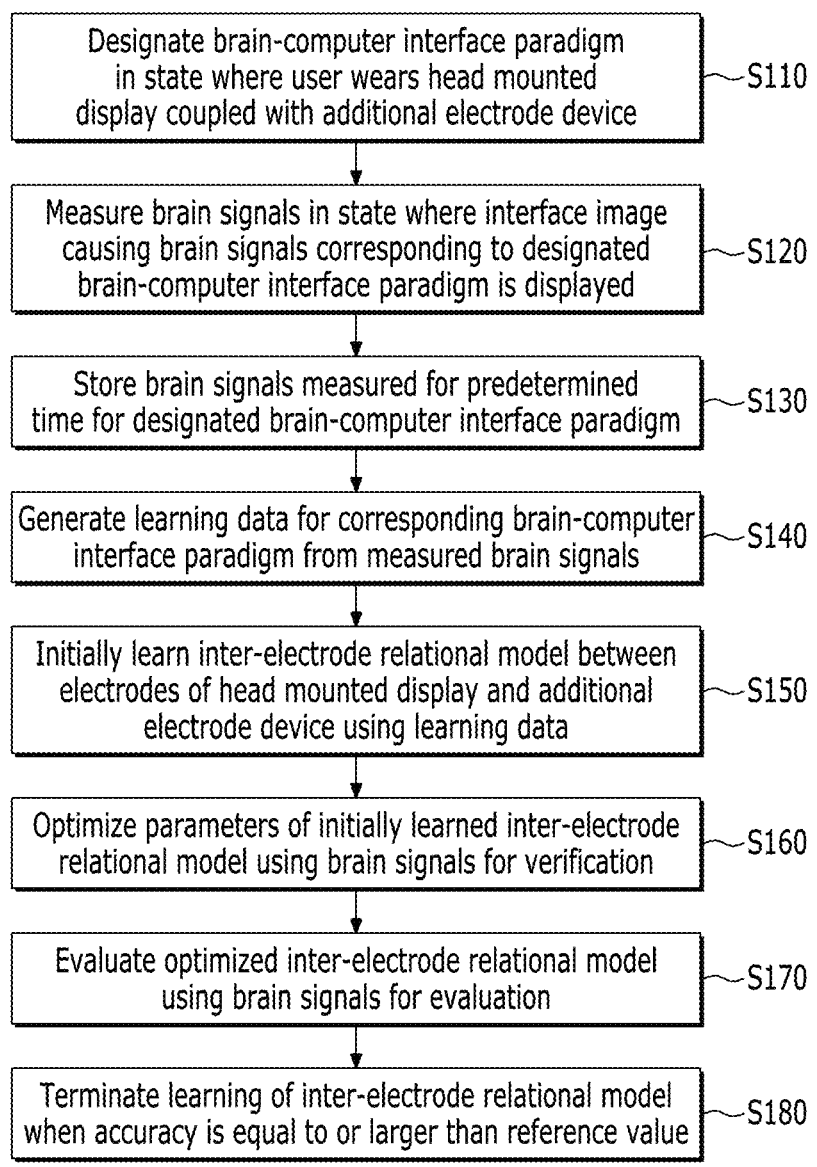
FIG. 7 is a flowchart illustrating a method of learning an inter-electrode relational model by the controller according to one exemplary embodiment.

FIG. 7 is a flowchart illustrating a method of learning an inter-electrode relational model by the controller according to the exemplary embodiment.

Referring to FIG. 7, the controller 300 may designate a brain-computer interface paradigm in the state where the user wears the head mounted display 100 coupled with the additional electrode device 200 in operation S110. The brain-computer interface paradigm may be selected by a user, and set in a learning mode.

The controller 300 may measure brain signals of the user in the state where an interface image causing brain signals corresponding to the designated brain-computer interface paradigm is displayed in operation S120. Brain signals x1, x2, . . . , and xnx measured by the electrodes of the head mounted display 100 and brain signals $y_1, y_2, \ldots,$ and $y_{ny}$ measured by the electrodes of the additional electrode device 200 are obtained. In this case, the brain signals measured by the head mounted display 100 and the additional electrode device 200 have the same sampling rate. Each electrode may be identified by a channel identifier. In the meantime, the electrodes (channels) of the head mounted display 100 may be called a first channel group and the electrodes (channels) of the additional electrode device 200 may be called a second channel group.

The controller 300 may store the brain signals measured for a predetermined period for the designated brain-computer interface paradigm in operation S310. A band pass filter is applied to the measured brain signals, and the measured brain signals are pre-processed to be normalized. The band pass filter may be set with a frequency range related to a designated brain signal measurement paradigm. Various normalization methods may be used. For example, the brain signals may be normalized that a mean of the brain signals of the electrodes (channels) is 0 and a variance of the brain signals is 1.

The controller 300 may generates learning data for the corresponding brain-computer interface paradigm from the measured brain signals in operation S140. The brain signals for learning may be obtained by repeatedly trying the measurement for a predetermined period by each electrode, or may be obtained by continuously measuring for time duration by each electrode. Otherwise, the brain signal for learning may be generated by accumulating brain signals (samples) measured in the past (for example, previous measurement cycles) by each electrode. In the meantime, the controller 300 separates the measured brain signals into signals for learning, signals for verification, and signals for evaluation. That is, some of the measured brain signals may be used as learning data.

The controller 300 may initially learn an inter-electrode relational model W between the electrodes of the head mounted display 100 and the additional electrode device 200 using the learning data in operation S150. The inter-electrode relational model W includes a relation of the brain signals of the head mounted display 100 and the brain signals of the additional electrode device 200. Then the inter-electrode relational model W is used to estimate brain signals at non-measured points from the brain signals measured by the head mounted display 100. The non-measured points are the positions of the electrodes of the additional electrode device 200, and may be called estimation points of brain signal.

The controller 300 may optimize parameters of the initially learned inter-electrode relational model W using the brain signals for verification in operation S160.

The controller 300 may evaluate the optimized inter-electrode relational model W using the brain signals for evaluation in operation S170. As a relational model evaluation index, a correlation coefficient of the measured brain signal y and the estimated brain signal ŷ from the inter-electrode relational model, or a mean square error may be used. When a correlation coefficient is close to 1 or a mean square error is close to 0, accuracy of the relational model is increased.

When the accuracy is equal to or larger than a reference value, the controller 300 may terminate the learning of the inter-electrode relational model in operation S180. When the accuracy is lower than the reference value, the controller 300 may repeat the learning of the inter-electrode relational model, the optimization, and the evaluation. The controller 300 may request an additional brain signal measurement as necessary. The controller 300 may learn the inter-electrode relational model for each brain-computer interface paradigm.

The controller 300 may improve the accuracy of the inter-electrode relational model through an error correction method to optimize the inter-electrode relational model by feedback an error of the estimated brain signals. The controller 300 may correct an error by a combination of various regression analysis. For example, an error of the brain signal estimated using a linear regression analysis may be decreased using a Kernel ridge regression analysis.

The inter-electrode relational model may be variously generated according to the applied regression analysis scheme. The inter-electrode relational model may be generated by, for example, a linear regression analysis, a Ridge regression analysis, a Kernel ridge regression analysis, and an ensemble regression analysis. The number of variables of the inter-electrode relational model is changed according to a regression model, and for example, a ridge size is a variable of the relational model generated by the ridge regression analysis, and a ridge size, a kernel size, and the like may be variables of the relational model generated by the Kernel ridge analysis.

The inter-electrode relational model according to the regression analysis may be defined as represented in Table 1. In Table 1, x is a brain signal measured by the head mounted display 100, and y is a brain signal measured by the additional electrode device 200. λ is a variable indicating a size of ridge. k means a kernel, and as the kernel, a linear kernel, a polynomial kernel, a Gaussian kernel, and the like may be selectively used. m is the number of models used in an ensemble, and may be formed by a combination of various models, as well as the three models.

TABLE 1

| Regression analysis scheme | Inter-electrode relational model |
|---|---|
| Linear regression analysis | $w_{Linear} = (x^t x)^{-1} x^t y$ |
| Ridge regression analysis | $w_{Ridge} = (x^t x + \lambda I_p)^{-1} x^t y$ |
| Kernel ridge regression analysis | $w_{KRR} = y(K + \lambda I_p)^{-1} k(x)$ |
| | $K = k(x_i, x_j) = \Phi(x_i)^t \Phi(x_j)$ |
| Ensemble regression analysis | $w_{Ensemble} = (w_{Linear} + w_{Ridge} + w_{KRR})/m$ |

The controller 300 may select a measurement method, process the measured data, and generate various dimensions of learning data. For example, the controller 300 may repeatedly try to perform the measurement for a predetermined time in a specific brain-computer interface paradigm and obtain brain signals in the corresponding paradigm. The brain signals obtained according to the repeated trial of the measurement may be stored as data dimensions (the number of data) like Type 1 of Table 2. The brain signal obtained according to a continuous time is Type 2 of Table 2, and a dimension of data in this case is the same as the number of electrodes. The brain signal obtained according to the repetitive trial is Type 3 of Table 2, and may be transformed to data combined with the trial time and be stored.

TABLE 2

| Type | Brain signals of head display mounted ($N_{ex}$: Number of electrodes) | Brain signals of additional electrode device ($N_{cy}$: number of electrodes) |
|---|---|---|
| 1 | $x \in \mathbb{R}^{N_{ex} \times T_{trial} \times N_{trial}}$ $T_{trial}$: Time of single trial $N_{trial}$: Number of trial | $y \in \mathbb{R}^{N_{ex} \times T_{trial} \times N_{trial}}$ $T_{trial}$: Time of single trial $N_{trial}$: Number of trial |

TABLE 2-continued

| Type | Brain signals of head display mounted ($N_{ex}$: Number of electrodes) | Brain signals of additional electrode device ($N_{cy}$: number of electrodes) |
|---|---|---|
| 2 | $x \in \mathbb{R}^{Nex \times T}$, T: Time | $y \in \mathbb{R}^{Ncy \times T}$, T: Time |
| 3 | $x \in \mathbb{R}^{Nex \times T_{trial} \times nt}$ $T_{trial \times nt}$: Entire trial time | $y \in \mathbb{R}^{Ncy \times T_{trial} \times nt}$ $T_{trial \times nt}$: Entire trial time |

In the meantime, the controller 300 may accumulate the predetermined number of brain signals (samples) measured in the past (previous cycle) by each electrode and generate learning data. The controller 300 may convert a brain signal characteristic at a specific time point t (current cycle) by using time-delayed samples.

A feature vector [x'(t)] of the brain signal converted by the time-delayed samples at the specific time point t may be expressed as a vector represented in Equation 1, and the brain signal converted by the time-delayed samples may be stored as a data dimension as represented in Equation 2. In Equation 1, ch is an electrode channel and k is the number of time-delayed samples. In Equation 2, $N_{cx \times delay}$ is a multiplication of the number of electrodes and the number of time-delayed samples, and $T_{trial \times nt}$ is an entire trial time.

$$x'(t)=[x_1(t),x_1(t-1), \ldots ,x_1(t-k),x_2(t),x_2(t-1), \ldots ,x_2(t-k), \ldots ,x_{ch}(t),x_{ch}(t-1), \ldots ,x_{ch}(t-k)] \quad \text{(Equation 1)}$$

$$x' \in \mathbb{R}^{Ncx \times delay \times T_{trial} \times nt} \quad \text{(Equation 2)}$$

The time-delayed samples are accumulated for each electrode and are used for the learning of the inter-electrode relation at the specific time t, so that there is an effect in that the number (dimension) of brain signals used at the specific time is increased. That is, when learning data indicating the inter-electrode relation at the specific time t is generated, only the brain signals measured at the specific time t are not used, but the brain signals measured in the past are also included in the learning data indicating the inter-electrode relation at the specific time t. For example, when 10 time-delayed samples are used for the brain signals measured by three electrodes of the head mounted display, 30 features are used in order to estimate a brain signal at a specific time t. In comparison of Tables 3 to 5, it can be seen that the same delay method may improve accuracy of the relational model.

Table 3 is correlation coefficients of the measured brain signals and the estimated brain signals (y,ŷ) for the learning data for 10 seconds when there is no sample delay. Table 4 is correlation coefficients of the two brain signals (y,ŷ) when 15 sample delays are applied to the learning data for 10 seconds. Table 5 is correlation coefficients of the two signals (y,ŷ) when 15 sample delays are applied to the learning data for 25 seconds. In comparison of Tables 3 to 5, it can be seen that when the relational model is learned using the time-delayed samples, the correlation coefficient is increased. Even when the learning data is increased, the correlation coefficient is increased. The correlation coefficient is an index of evaluating accuracy of the relational model.

TABLE 3

| Relational model | Mean value | Minimum value | Maximum value |
|---|---|---|---|
| Linear regression analysis | 0.6430 | 0.3993 | 0.8472 |
| Ridge regression analysis | 0.6443 | 0.4117 | 0.8489 |
| Kernel ridge regression analysis | 0.6439 | 0.4047 | 0.8462 |

TABLE 4

| Relational model | Mean value | Minimum value | Maximum value |
|---|---|---|---|
| Linear regression analysis | 0.7211 | 0.5487 | 0.8761 |
| Ridge regression analysis | 0.7241 | 0.5185 | 0.8862 |
| Kernel ridge regression analysis | 0.7243 | 0.5408 | 0.8809 |

TABLE 5

| Relational model | Mean value | Minimum value | Maximum value |
|---|---|---|---|
| Linear regression analysis | 0.7649 | 0.5943 | 0.9114 |
| Ridge regression analysis | 0.7604 | 0.5742 | 0.9043 |
| Kernel ridge regression analysis | 0.7614 | 0.5912 | 0.9115 |

In the meantime, according to the characteristic of the deep learning that when the amount of learning data is large, high classification performance is provided, each learning data may be data-augmented. For example, the data augmentation method may be utilized for a steady-state visual/auditory/somatosensory evoked potential utilizing frequency information of a brain signal. For example, a window having a small size is applied to brain signal collected during the single trial, and frequency characteristics are extracted by moving samples one by one in a time axis. The extracted frequency characteristics may be used as learning data.

Figure 8:
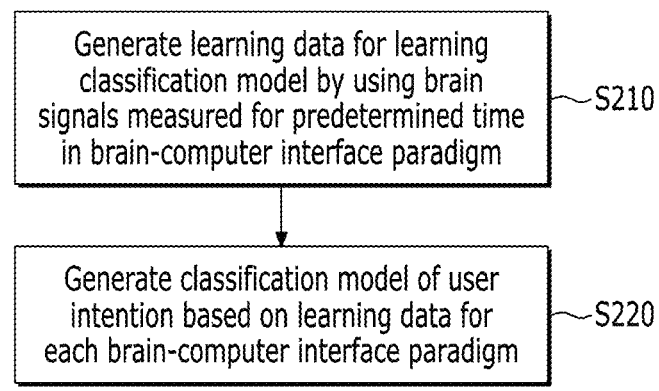
FIG. 8 is a flowchart illustrating a method of learning a classification model for recognizing a user intention by the controller according to one exemplary embodiment.

FIG. 8 is a flowchart illustrating a method of learning a classification model for recognizing a user intention by the controller according to the exemplary embodiment.

Referring to FIG. 8, the controller 300 may generate learning data for learning a classification model using brain signals measured for a predetermined time in the brain-computer interface paradigm in operation S210. The controller 300 may generate the learning data for the classification model using the brain signals measured for the learning of the inter-electrode relational model. In the meantime, the controller 300 may use the measured brain signals and the brain signals estimated by the inter-electrode relational model as the learning data for the learning of the classification model. The learning data may be combined brain signal EEGcombination, which includes the brain signal x of the head mounted display 100 and the brain signal y of the additional electrode device 200. The EEG-combination may be variously processed according to a trial time, the number of trial, and so on, similar to the feature vector of Table 2 used for the learning of the inter-electrode relational model.

The controller 300 may generate a classification model for user intention based on the learning data for each brain-computer interface paradigm in operation S220. In this case, the controller 300 may generate the classification model using various pattern recognition and machine learning schemes, such as a common spatial pattern, a linear discriminant analysis, a support vector machine, a canonical correlation analysis, Fourier transform, and deep learning. The classification model may be generated by learning procedure, verification procedure, and evaluation procedure, similar to the learning of the inter-electrode relational model.

The different classification model is generated according to the brain-computer interface paradigm.

In the case of the brain signal measured in the motor imagery paradigm, a common spatial pattern method may be used to design a spatial filter which maximizes dispersion difference between two different classes by maximizing dispersion for one class and minimizing dispersion of the other class. The dispersion of the brain signal converted through the filter is calculated and normalized to be used as a feature vector for classifying the user intention. In this case, a classifier, such as a linear discriminant analysis, a support vector machine, and deep learning, may be used.

In the case of the brain signal measured at the steady-state visual/auditory/somatosensory evoked potential, a canonical correlation analysis, Fourier transform, and the like, which are capable of considering a frequency characteristic, may be used. When the canonical correlation analysis scheme is progressed, reference signals having frequencies, such as visual/auditory/somatosensory stimulus, are generated. Further, a weight vector for maximizing a correlation between the reference signals and the single trial brain signal is obtained through the canonical correlation analysis scheme, and the user intention is classified by using a correlation between the weight vector and each reference signal. A classifier, such as maximum value comparison, k-nearest neighbor, a support vector machine, and deep learning, may be used.

In the case of the brain signal measured at the event evoked potential, the user intention is classified using a change of a brain signal generated after an event (or stimulus) is given and then a specific time (several hundreds of ms) is elapsed. First, a brain signal characteristic related to the event evoked potential is extracted from the brain signal through a linear discriminant analysis, a principal component analysis, and an independent component analysis. A classifier, such as a linear discriminant analysis, a support vector machine, and deep learning, may be used.

Figure 9:
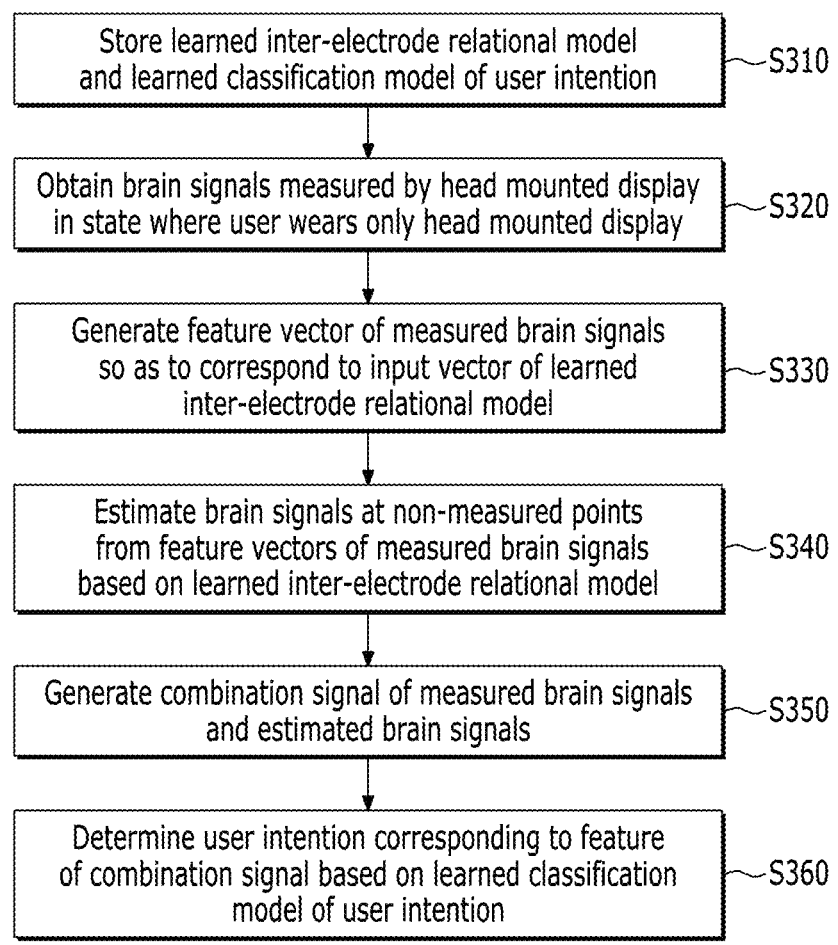
FIG. 9 is a flowchart illustrating a method of estimating a brain signal by the controller according to one exemplary embodiment.

FIG. 9 is a flowchart illustrating a method of estimating a brain signal by the controller according to the exemplary embodiment.

Referring to FIG. 9, the controller 300 may store the learned inter-electrode relational model and the learned classification model of user intention in operation S310.

In the state where the user wears the head mounted display 100 from which the additional electrode device 200 is separated, the controller 300 may obtain brain signals x* measured by the head mounted display 100 in operation S320. The controller 300 may pre-processe the measured brain signals identically to the pre-processing performed during the learning.

The controller 300 may generate a feature vector of the measured brain signals so as to correspond to an input vector of the learned inter-electrode relational model i ╞ in operation S330. That is, the controller 300 may measure and process the brain signals in accordance with the data dimension and the data form used in the learning of the inter-electrode relational model. For example, as represented in Equation 1, the controller 300 may accumulate the time-delayed samples for each electrode, and generate the accumulated samples as a feature vector at the specific time t.

The controller 300 may estimate brain signals at non-measured points from the feature vectors of the measured brain signals based on the learned inter-electrode relational model in operation S340. The non-measured points correspond to the positions of the electrodes of the additional electrode device 200.

The controller 300 may generate a combination signal (EEGcombination) of the measured brain signals x* and the estimated brain signals ŷ in operation S350. In this case, the combination signal may be expressed as a signal vector obtained in the electrodes of the head mounted display and the estimated electrodes of the additional electrode device duration time T, as Equation 3.

$$EEG_{combination} \in \mathbb{R}^{N_{ex+cy} \times T}$$ (Equation 3)

The controller 300 may determine a user intention corresponding to a feature of the combination signal based on the learned classification model of the user intention in operation S360. For example, the classification model learning the motor imagery potential may classify an imaging region of the user based on the feature of the brain signal. The classification model is learned to classify to any one among the plurality of intentions in the brain-computer interface paradigm.

As described above, even when the large number of electrodes is not attached to the head of the user, it is possible to improve the recognition of a user intension and thus conveniently provide virtual/augmented reality through the wearing of only the head mounted display.

Figure 10A:
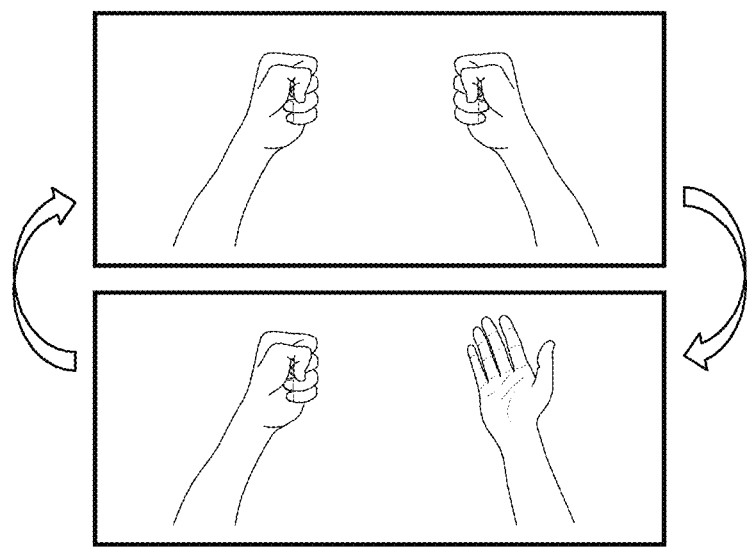
FIGS. 10A and 10B are examples illustrating a learning interface image for motor imagery in a brain-computer interface paradigm.
Figure 10B:
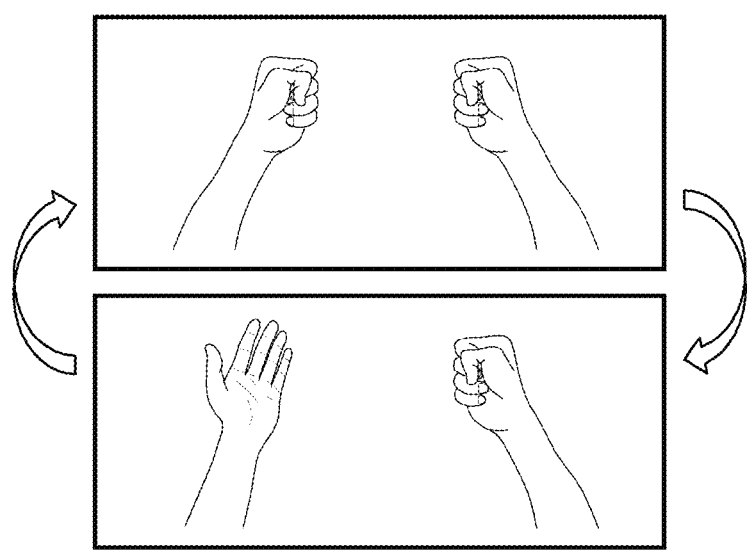
Figure 11A:
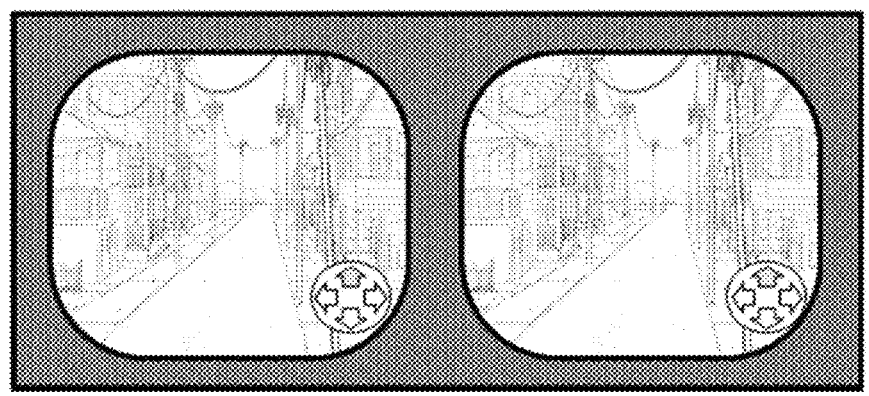
FIGS. 11A, 11B and 12 are examples illustrating image control according to the motor imagery.
Figure 11B:
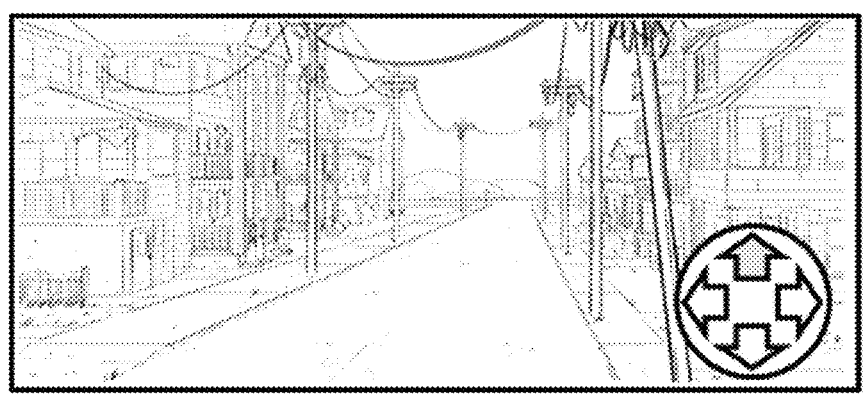
Figure 12:
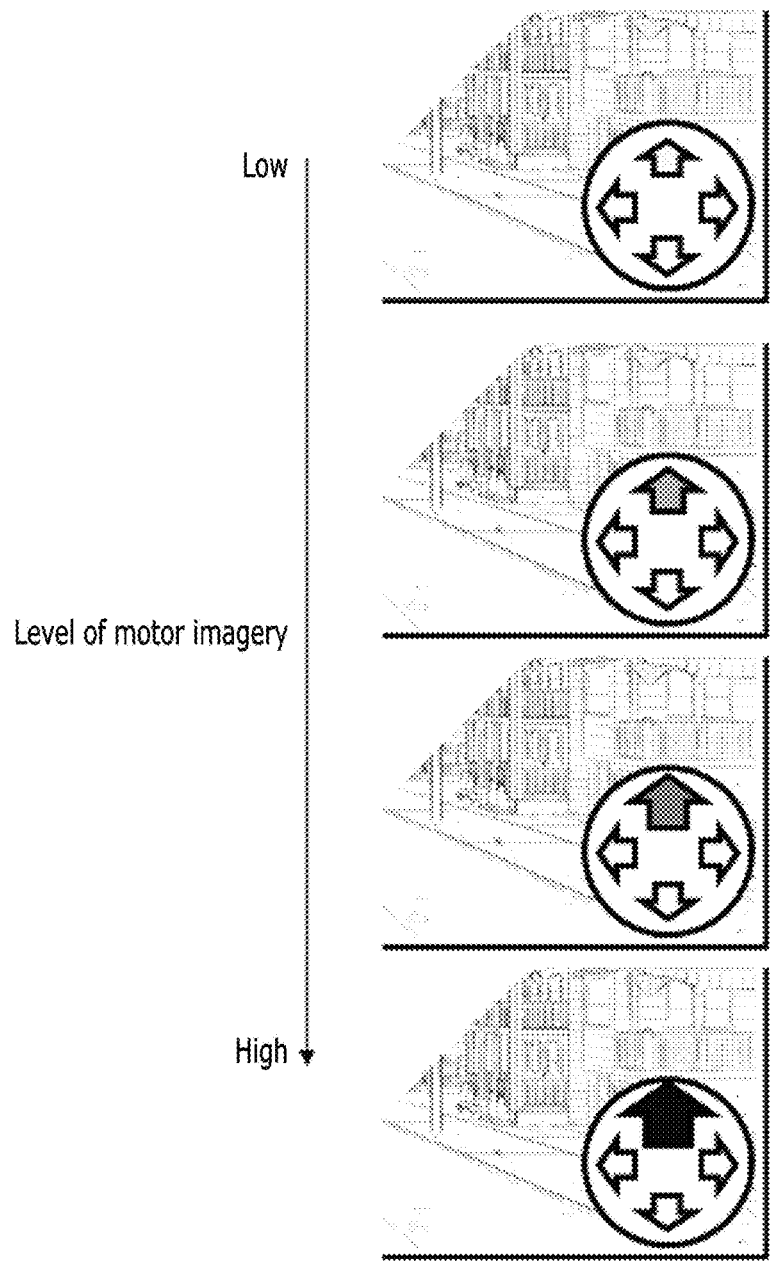

FIGS. 10A and 10B are examples illustrating a learning interface image for motor imagery in the brain-computer interface paradigm, and FIGS. 11A, 11B and 12 are examples illustrating image control according to the motor imagery.

Referring to FIGS. 10A and 10B, the controller 300 presents an image, which makes the user wearing the head mounted display 100 coupled with the additional electrode device 200 imagine a movement through a specific body part, such as a right hand, a left hand, a foot, and a tongue, to the user for the motor imagery learning in the brain-computer interface paradigm. For example, the controller 300 may provide images of a first-person point of view based on a user. The controller 300 may induce brain signals while showing a scene in which an operation of clenching and opening each of a right hand and a left hand is repeated, a scene in which toes are bobbed up and down, or a scene in which a tongue moves. In addition, the controller 300 may also induce the imagination of a body movement while showing upper/lower/left/right arrows or the predetermined form of figure, and may repeat the induction while changing a to-be used body part of the motor imagery.

When the imagery motor is selected as the brain-computer interface paradigm, FIG. 10A is an example illustrating an image presented in a learning operation for inducing a right hand operation imagery brain signal, and FIG. 10B is an example illustrating an image presented in a learning operation for inducing a left hand operation imagery brain signal.

The controller 300 may recognize a movement of a specific region on the virtual reality image/augmented reality image presented to the user based on the inter-electrode relational model and classification model learned through the brain signals caused by the motor imagery. According to the present disclosure, the user may move a three-dimensional space by using the motor imagery.

For example, as illustrated in FIG. 11A, when the head mounted display 100 provides the user with a left image and a right image, the user recognizes the image illustrated in FIG. 11B through the head mounted display 100. In this case, the controller 300 may map a movement of a foot to going forwards, a movement of a right hand to turning right, a movement of a left hand to turning left, and a movement of a tongue to going backwards. The controller 300 may recognize a motor imagery region from the brain signal of the user on the virtual reality image/augmented reality image presented to the user, and control the image mapped to the recognized region. Further, when the user does not perform the motor imagery, the controller 300 may stop the movement of the image.

Referring to FIG. 12, when the controller 300 detects specific body movement imagery, the controller 300 may change a color/shape/size of a direction indication arrow corresponding to the specific body movement on the interface image.

The controller 300 may feedback a continuous time or an intensity of the user intention detected by using the motor imagery. For example, when the foot motor imagery mapped to the going forwards continues or an intensity thereof is increased, the controller 300 may change a shape/size of an arrow in the forward direction. Accordingly, the controller 300 may provide a feedback for whether the proper motor imagery is manifested to the user, thereby providing the convenient and accurate interface.

Figure 13A:
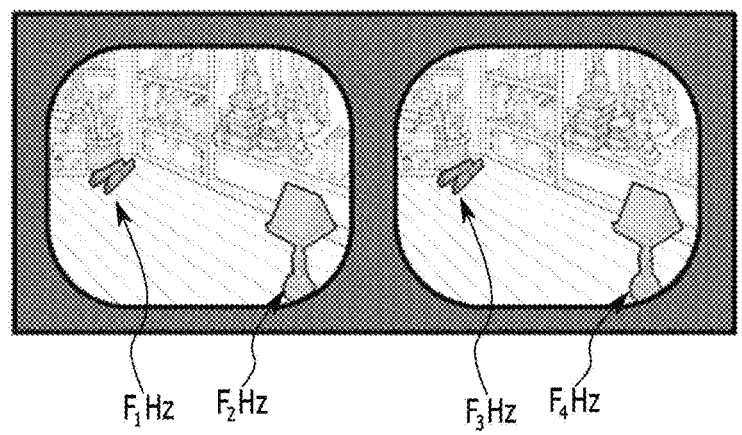
FIGS. 13A and 13B are examples illustrating a learning interface image for a steady state visual evoked potential in the brain-computer interface paradigm.
Figure 13B:
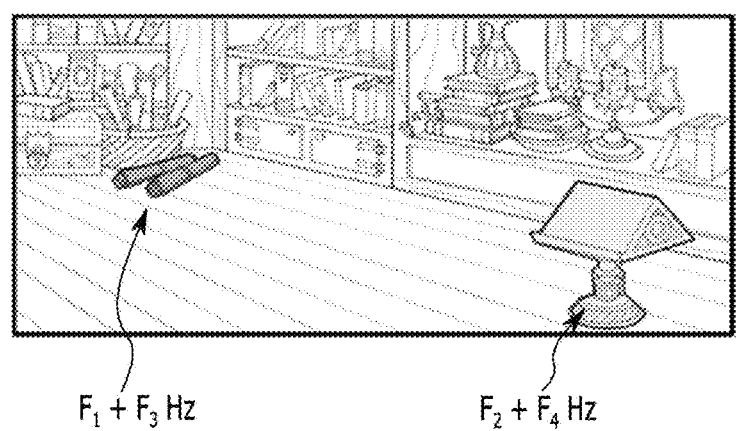

FIGS. 13A and 13B are examples illustrating a learning interface image for a steady state visual evoked potential in the brain-computer interface paradigm.

Referring to FIGS. 13A and 13B, for the learning of a steady state visual evoked potential, the controller 300 presents an image including at least one visual stimulus to the user wearing the head mounted display 100 coupled with the additional electrode device 200. For example, the visual stimulus may be flickering at a specific frequency while the stimulus is presented, and may include a figure, a character, an object shape, and the like.

The controller 300 may recognize objects, to which a visual stimulus pattern is allocated, on the virtual reality image/augmented reality image presented to the user based on the inter-electrode relational model and classification model learned through the brain signals caused by the steady state visual evoked potential. To this end, the visual environment and augmented reality image is produced so as to measure the brain signals caused by the visual stimulus by allocating a visual stimulus pattern corresponding to a specific object. In this case, the visual stimulus may be various forms, such as a figure and a character, as well as a specific object, and various user intentions may be detected through the various forms of visual stimulus.

Referring to FIG. 13A, when the steady state visual evoked potential is selected in the brain-computer interface paradigm, the head mounted display 100 provides the user with a left image and a right image, and may provide different visual stimulus frequencies of a specific object in the left and right images. For example, a visual stimulus for a first object is provided to the left eye with F1 Hz and to the right eye with F3 Hz. Further, a visual stimulus for a second object is provided to the left eye with F2 Hz and to the right eye with F4 Hz.

The user recognizes an image illustrated in FIG. 13B through the head mounted display. In this case, the user may improve user intention recognition performance by recognizing two kinds of frequency components. That is, the user may recognize the first object by a combination of F1 Hz and F3 Hz, and recognize the second object by a combination of F2 Hz and F4 Hz.

Figure 14A:
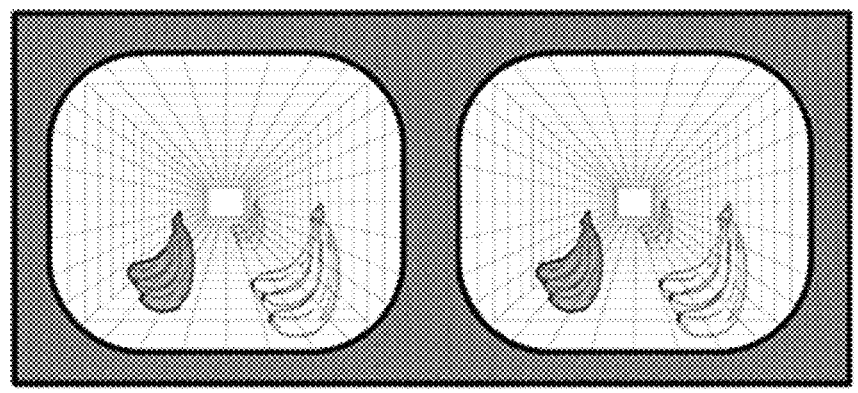
FIGS. 14A and 14B are examples illustrating a learning interface image for an event-related potential in the brain-computer interface paradigm.
Figure 14B:
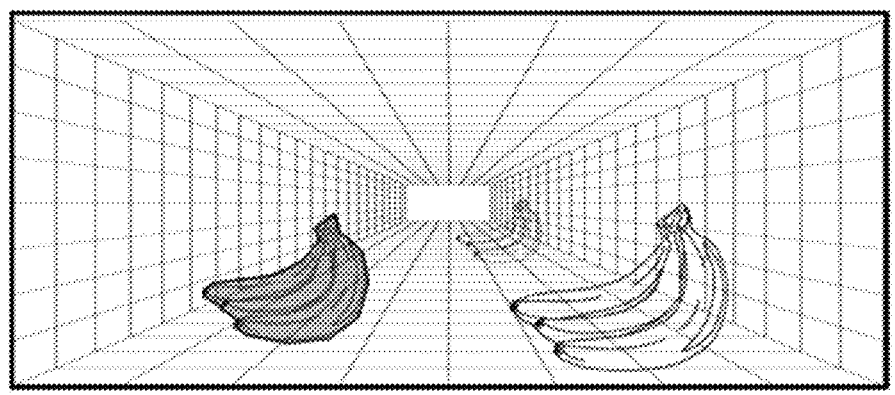
Figure 15A:
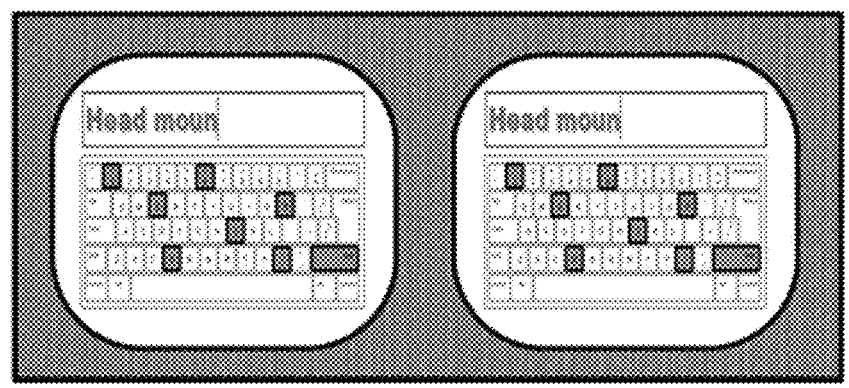
FIGS. 15A and 15B are examples illustrating a character input interface by using a visual stimulus based on an event-related potential.
Figure 15B:
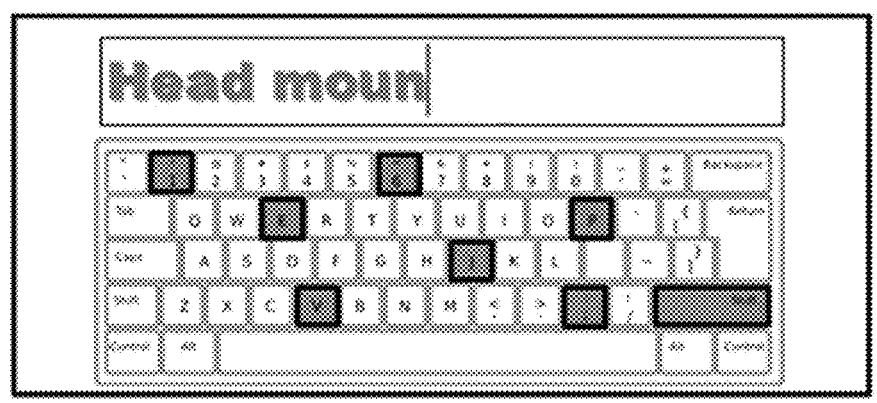

FIGS. 14A and 14B are examples illustrating a learning interface image for an event-related potential in the brain-computer interface paradigm, and FIGS. 15A and 15B are examples illustrating a character input interface by using a visual stimulus based on an event-related potential.

Referring to FIGS. 14A and 14B, for the learning of an event-related potential, the controller 300 presents an image including at least one visual stimulus to the user wearing the head mounted display 100 coupled with the additional electrode device 200. For example, one or more visual stimuli may be presented, and the visual stimuli may be presented while being alternately in an order unpredicted by the user. The visual stimulus may include a figure, a character, a picture, a face, a sound, and the like. The event-related potential may be conveniently used when various stimuli are presented in a three-dimensional space.

The controller 300 may recognize objects selected by the user on the virtual reality image/augmented reality image presented to the user through the visual stimulus, based on the inter-electrode relational model and classification model learned using the brain signals caused by the event-related potential. To this end, the visual environment and augmented reality image is produced so as to measure the brain signals caused by the visual stimulus by allocating a visual stimulus pattern corresponding to a specific object.

Referring to FIG. 14A, when the event-related potential is selected in the brain-computer interface paradigm, the head mounted display 100 provides the visual stimulus using the event-related potential for the object existing in a three-dimensional space. The user recognizes an image illustrated in FIG. 14B through the head mounted display.

The method of providing the visual stimulus using the event-related potential may be various. For example, objects at different distances are alternately flickered and a repetition of the flickering is provided at an unpredictable time or in an unpredictable order to the user.

The controller 300 learns a brain signal caused when the user looks at a desired object in the interface image, and recognizes a user intention based on the learned classification model.

Referring to FIGS. 15A and 15B, the controller 300 may provide a character input function using an input interface causing an event-related potential. When the head mounted display 100 provides the user with an input interface as illustrated in FIG. 15A, the user recognizes the input interface as illustrated in FIG. 15B. For example, the input interface may be a keyboard having a QWERTY form, in which the characters are alternately flickered.

Figure 16:
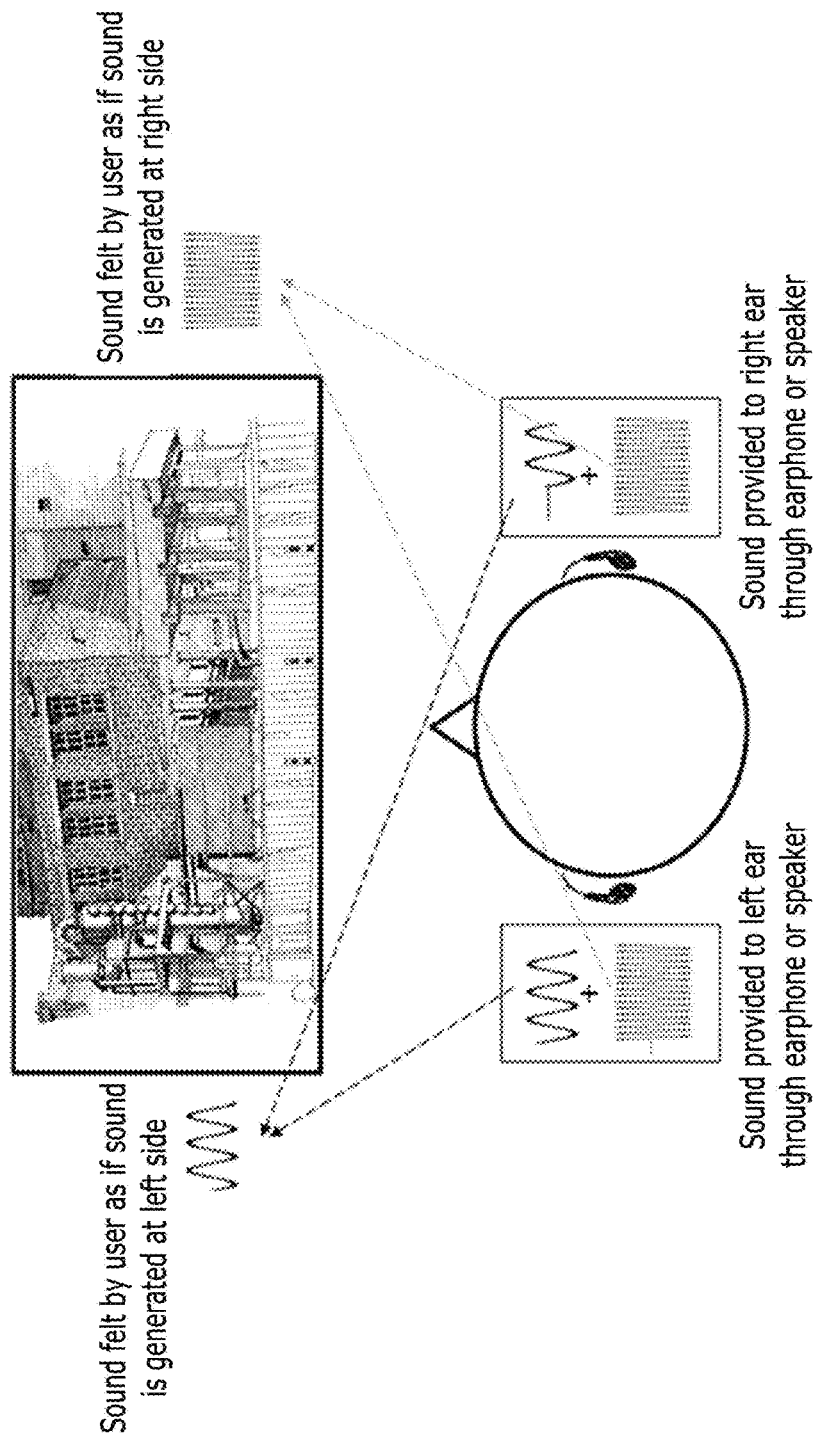
FIG. 16 is an example illustrating a learning interface image for a steady state auditory evoked potential in the brain-computer interface paradigm.

FIG. 16 is an example illustrating a learning interface image for a steady state auditory evoked potential in the brain-computer interface paradigm.

Referring to FIG. 16, for the learning of a steady state auditory evoked potential, the controller 300 may present an image including at least one auditory stimulus to the user wearing the head mounted display 100 coupled with the additional electrode device 200. For example, one or more auditory stimuli may be presented, and the auditory stimuli may be presented while being alternately in an unpredictable order to the user. The auditory stimulus may be formed of a single frequency or a combination of a plurality of frequencies. The auditory stimulus may be provided through a speaker or an earphone included in the head mounted display 100.

The controller 300 may recognize a user intention on the virtual reality image/augmented reality image presented to the user based on the inter-electrode relational model and classification model learned through the brain signals caused by the steady state auditory evoked potential.

The method of presenting the auditory stimulus may be various, and for example, an auditory stimulus, which makes the user feel as if sounds are generated in the left side and the right side based on the user, respectively, may be provided. In this case, the sound, for which the user feels as if the sound is generated at the left side, may be provided without a time delay, and the sound, for which the user feels as if the sound is generated at the right side, may be provided with a time delay, compared to the left side, and a reverse case thereof is available.

The sounds heard from both sides are formed of the sounds having different frequencies, respectively, a left or right intention of the user may be detected by analyzing a brain signal generated when the user concentrates on the sound of any one side. Further, it is also possible to provide directionality of the sound stimulus by differently providing a size of the sound, as well as the time delay.

In addition, at least one vibration stimulus, which is connected with the head mounted display 100 wirely/wirelessly, may be attached to the body of the user, and the controller 300 may also present a stimulus through the vibration stimulus for the learning of the steady state auditory evoked potential.

As described above, the controller 300 may recognize a user intention corresponding to the measured and estimated brain signal on the visual reality image/augmented reality image presented to the user by using the classification model for recognizing the user intention learned based on the brain signal. Further, the controller 300 may control the visual reality image/augmented reality image according to the recognized user intention, such as moving a body part/an object, selecting an object, or making an input through a keyboard.

Figure 17A:
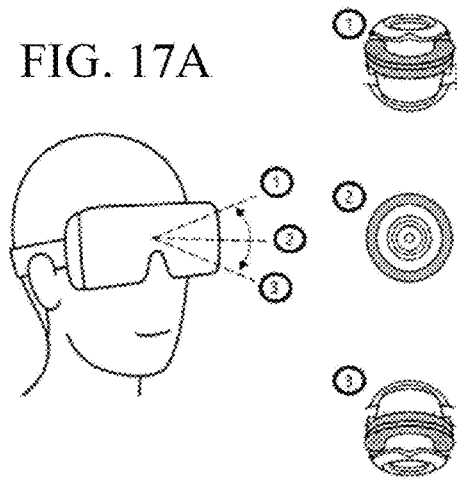
FIGS. 17A, 17B and 17C are examples illustrating image control by a movement of an eyeball of a user according to one exemplary embodiment.
Figure 17B:
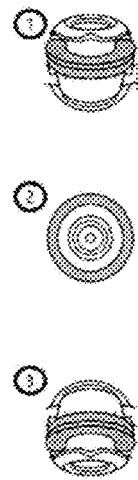
Figure 17C:
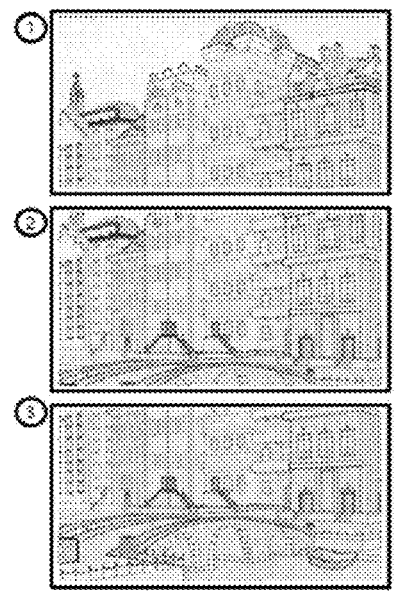
Figure 18:
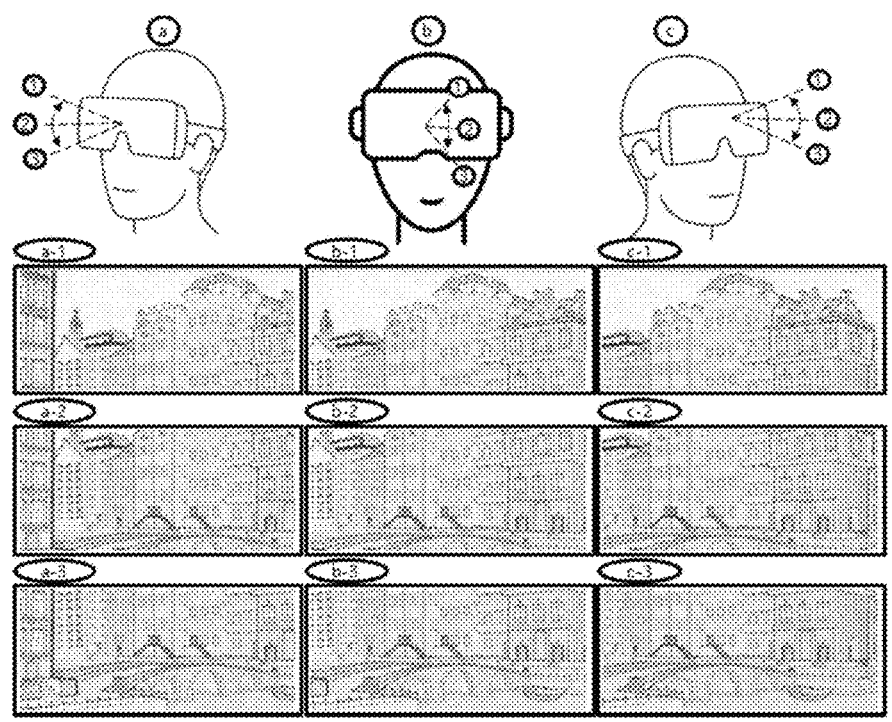
FIG. 18 is an example illustrating image control by movements of a head and an eyeball of a user according to one exemplary embodiment.

FIGS. 17A, 17B and 17C are examples illustrating image control by a movement of an eyeball of a user according to one exemplary embodiment, and FIG. 18 is an example illustrating image control by movements of a head and an eyeball of a user according to one exemplary embodiment.

Referring to FIGS. 17A, 17B, 17C and 18, the controller 300 may recognize a user intention (for example, a direction change and a gaze movement direction) according to a movement of a user gaze or user viewpoint, based on an EOG signals measured from the head mounted display 100. That is, the controller 300 may recognize the EOG signals as the user intention and control the head mounted display. The controller 300 may control the head mounted display based on the user intention determined (recognized) from brain signals and the EOG signal.

In this case, similar to the method of recognizing the user intention using the classification model of the user intention learned based on the brain signal, the controller 300 may learn a classification model of the user intention (e.g., gaze movement) based on the EOG signal, and detect a user gaze movement based on the learned classification model.

The controller 300 may provide a cursor image for making the user to look to the head mounted display 100 for detecting the user gaze movement according to the EOG signals. The user moves the eye according to the cursor, and the EOG signals are generated in response to the movement of the user eye and obtained from EOG electrodes.

In the cursor image, a horizontal axis (x-axis) and a vertical axis (y-axis) are formed from a center, and velocity v with respect to a horizontal direction and a vertical direction, respectively, may be calculated as Equation 4 through a change of the cursor position.

$$v_x(t)=x(t)-x(t-1)$$

$$v_y(t)=y(t)-y(t-1) \quad \text{(Equation 4)}$$

The controller 300 extracts a vertical component ($EOG_{lup}$, $EOG_{ldown}$, $EOG_{lleft}$, $EOG_{lright}$), and a horizontal component ($EOG_{rup}$, $EOG_{rdown}$, $EOG_{rleft}$, $EOG_{rright}$) by using the electrodes ($EOG_{lv}$, $EOG_{rv}$) attached around the left eye and the electrodes ($EOG_{lh}$, $EOG_{rh}$) attached around the right eye.

The vertical component and the horizontal component measured in the left eye may be expressed by Equation 5.

$$EOG_{lv}(t)=EOG_{lup}(t)-EOG_{ldown}(t)$$

$$EOG_{lh}(t)=EOG_{lleft}(t)-EOG_{lright}(t) \quad \text{(Equation 5)}$$

The controller 300 may generate a dependent variable as a velocity of the cursor, and an independent variable, as EOG signal of a regression model for establishing a relational model between a velocity of the cursor and the EOG as Equation 6.

$$v(t)=[v_x(t),v_y(t)]'$$

$$EOG(t)=[EOG_{lv}(t),EOG_{lh}(t),EOG_{rv}(t),EOG_{rh}(t)]' \quad \text{(Equation 6)}$$

Similar to the learning method during the processing of the brain signal, the controller 300 may generate the relational model by applying various regression analysis schemes and detect a gaze movement from an EOG signal generated when the user moves eyes based on the relational model. Accordingly, the controller 300 outputs an image, of which a view point is changed according to the gaze movement of the user, thereby providing a natural image.

Referring to FIG. 17A, a user moves eyeballs in upper and lower directions in the state where the user wears the head mounted display 100. Then, the controller 300 controls and photographs a lens angle of a camera as illustrated in FIG. 17B. Accordingly, the controller 300 may provide a image/scene matched to a view field of the user, as illustrated in FIG. 17C.

In the case of a virtual reality image, the controller 300 analyzes an EOG signal generated when the user looks an upper/lower/left/right/long distance/short distance area and moves the image to a corresponding viewpoint within the virtual reality image.

Referring to FIG. 18, a user may move eyes and a head together in the state where the user wears the head mounted display 100. A movement of the head may be measured by a gyro sensor and the like.

When it is assumed that FIG. 18B is an image, which the user currently gazes, the controller 300 provides image changes a-1 to a-3 when the head and the eyes of the user are moved as illustrated in FIG. 18A. When the head and the eyes of the user are moved as illustrated in FIG. 18C, the controller 300 provides image changes c-1 to c-3.

As described above, the controller 300 may generate the classification model of user intention by learning brain signals caused in the brain-computer interface paradigm, and further generate an inter-electrode relational model of the head mounted display 100 and the additional electrode device 200. Accordingly, even when the user wears only the head mounted display 100, it is possible to obtain sufficiently the brain signals required for controlling a virtual reality image/augmented reality image.

Further, the controller 300 may learn an EOG signal and detect a gaze movement (viewpoint change). Accordingly, it is possible to control a viewpoint of a virtual reality image/augmented reality image by moving the eyes in the state where the user wears only the head mounted display 100.

In this case, the measurement of a brain signal through the electroencephalogram electrode of the head mounted display 100 and the measurement of an EOG signal through the EOG electrode are progressed in parallel, and may be complexly applied to the control of the head mounted display.

The exemplary embodiment of the present disclosure described above is not implemented only by the apparatus and the method, and may also be implemented by a program executing a function corresponding to the configuration of the exemplary embodiment of the present disclosure or a recording medium, in which the program is recorded. Further, the described method may be implemented by a recording medium including computer readable commands.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of recognizing, by a controller, an intention of a user who wears a head mounted display to which electroencephalogram electrodes are attached, the method comprising:
   obtaining first brain signals for learning from each of electrodes of the head mounted display and electrodes of an additional electrode device coupled to the head mounted display, in a state where a training image causing the first brain signals is displayed on the head mounted display and the electrodes of the head mounted display and the electrodes of an additional electrode device are located at different positions from each other;
   learning an inter-electrode relational model between the electrodes of the head mounted display and the electrodes of the additional electrode device using the first brain signals for learning;
   measuring third brain signals by the electrodes of the head mounted display, not by the electrodes of the additional electrode device, in a state where a specific image causing the third brain signals is displayed on the head mounted display and the head mounted display is decoupled from the additional electrode device;
   estimating fourth brain signals of the electrodes of the additional electrode device caused by the specific image, not by measuring the electrodes of the additional electrode device, but by calculating based on the third brain signal measured by the head mounted display and the inter-electrode relational model; and
   recognizing a user intention corresponding to the measured third brain signals and the estimated fourth brain signals.

2. The method of claim 1, further comprising
   learning a classification model of user intention using the first brain signals for learning,
   wherein the recognizing the user intention determines the user intention using a combination signal of the measured third brain signals and the estimated fourth brain signals, based on the learned classification model.

3. The method of claim 1, wherein the training image is an interface image provided for causing the first brain signals corresponding to a specific brain-computer interface paradigm.

4. The method of claim 3, wherein the brain-computer interface paradigm is at least one of a motor imagery potential, a steady-state visual/auditory/somatosensory evoked potential, and an event-related potential.

5. The method of claim 3, wherein when the training image is an interface image causing the first brain signals corresponding to motor imagery,
   the first brain signals for learning comprises signals caused by an imagination of a movement of a designated body part on the training image.

6. The method of claim 3, wherein when the training image is an interface image causing the first brain signals corresponding to an event-related potential, the training image is separated into a left image and a right image corresponding to both eyes, respectively, and provides visual stimulus of flickering the same object at different frequencies on the left image and the right image, and
   wherein the first brain signals for learning comprises signals caused by the visual stimulus included in the training image.

7. The method of claim 3, wherein when the training image is an interface image causing the first brain signals corresponding to a steady-state visual evoked potential, the training image provides a plurality of selectable objects with different visual stimuli, and
   wherein the first brain signals for learning comprises signals caused when the user looks at a specific object among the plurality of objects on the training image.

8. The method of claim 1, wherein
   the learning the inter-electrode relational model comprises:
   generating feature vectors of the electrodes, respectively, wherein the feature vector of each electrode of the electrodes comprises brain signals measured at a predetermined number of past cycles and a current cycle, at the electrode; and
   learning the inter-electrode relational model using the feature vectors of the electrodes.

9. The method of claim 1, further comprising
   controlling the specific image based on the determined user intention.

10. The method of claim 9, wherein the controlling the specific image further comprises:
    detecting a gaze movement based on electrooculography signals measured from electrooculography electrodes attached to the head mounted display; and
    changing a viewpoint of the specific image according to the detected gaze movement.

11. The method of claim 10, further comprising
    before the controlling the specific image, learning a relational model between electrooculography signals for learning and movements of a cursor, wherein the electrooculography signals for learning and the movements of the cursor are obtained in a state where a cursor image displays the cursor moving according to a user gaze on the head mounted display, and
    wherein the detecting the gaze movement detects the gaze movement corresponding to the measured electrooculography signals based on the relational model between the electrooculography signals for learning and the movements of the cursor.

12. A brain-computer interface apparatus, comprising:
    a head mounted display having first electroencephalogram electrodes as a first channel group;
    an additional electrode device having second electroencephalogram electrodes as a second channel group, which is detachable from the head mounted display; and
    a controller which stores an inter-electrode relational model between first brain signals of the first channel group and second brain signals of the second channel group, and controls the head mounted display decoupled from the additional electrode device based on the inter-electrode relational model and third brain signals of the first channel group,
    wherein the first brain signals and the second brain signals are obtained in a state where a training image causing the first and second brain signals is displayed on the head mounted display, and the first electroencephalogram electrodes of the head mounted display and the second electroencephalogram electrodes of the additional electrode device are located at different positions from each other, wherein the controller receives the third brain signals measured by the first channel group in a state where a specific image is displayed on the head mounted display, estimates fourth brain signals of the second channel group based on the inter-electrode relational model and the third brain signals, recognizes a user intention using the measured third brain signals of the first channel group and the estimated fourth brain signals of the second channel group, and controls the specific image based on the user intention.

13. The brain-computer interface apparatus of claim 12, wherein the controller, in a learning mode that the head mounted display and the additional electrode device are coupled, displays the training image causing the first and second brain signals on the head mounted display, obtains the first brain signals for learning from the first channel group and the second brain signals for learning from the second channel group, learns the inter-electrode relational model using the first and second brain signals for learning, and stores the learned inter-electrode relational model.

14. The brain-computer interface apparatus of claim 13, wherein the training image is an interface image provided for causing the first and second brain signals corresponding to a specific brain-computer interface paradigm, and wherein the brain-computer interface paradigm is at least one of a motor imagery potential, a steady-state visual/auditory/somatosensory evoked potential, and an event-related potential.

15. The brain-computer interface apparatus of claim 13, wherein the controller learns the inter-electrode relational model based on a regression analysis on the first and second brain signals for learning.

16. The brain-computer interface apparatus of claim 12, wherein the controller recognizes the user intention corresponding to a feature of a combination signal based on a learned classification model of user intention, wherein the combination signal comprises the measured third brain signals from the first channel group and the estimated fourth brain signals of the second channel group, and wherein the classification model is trained to classify the user intention to any one of a plurality of intentions designed in a specific brain-computer interface paradigm, based on feature of the first and second signals of the first channel group and the second channel group.

17. A brain-computer interface apparatus, comprising:

a head mounted display which comprises a main body having at least one processor, a memory, and a display, and a fixing part connected to the main body, wherein the fixing part sustains the main body when user wears the head mounted display on head; and an additional electrode device having second electroencephalogram electrodes in internal surface contacting with the head of the user, which is coupled to or separated from the head mounted display, wherein the head mounted display further comprises:

a plurality of first electroencephalogram electrodes disposed on an inside of the fixing part along a head circumference to contact with the head of the user;

a plurality of electrooculography electrodes disposed on an inside of the main body to contact around eyes of the user;

a reference electrode disposed in a region of the main body that is in contact with face of the user; and a fastening part disposed on at least one of the main body and the fixing part, and coupled to or separated from the additional electrode device, wherein the at least one processor receives first brain signals from the first electroencephalogram electrodes and the second brain signals from the second electroencephalogram electrodes in a state where a training image causing the first and second brain signals is displayed on the head mounted display, stores an inter-electrode relational model between the first brain signals and the second brain signals, receives third brain signals measured by the first electroencephalogram electrodes in a state where a specific image causing the third brain signals is displayed on the head mounted display, estimated fourth brain signals of the second electroencephalogram electrodes based on the inter-electrode relational model and the third brain signals, and recognizes a user intention using the measured third brain signals and the estimated fourth brain signals, wherein the first electroencephalogram electrodes and the second electroencephalogram electrodes are located at different positions from each other.

* * * * *